July 27, 1954　　　　N. L. ROSIE　　　　2,684,537
STEREOSCOPIC FILM MOUNTING DEVICE
Filed April 22, 1950　　　　　　　　　　　　3 Sheets-Sheet 1
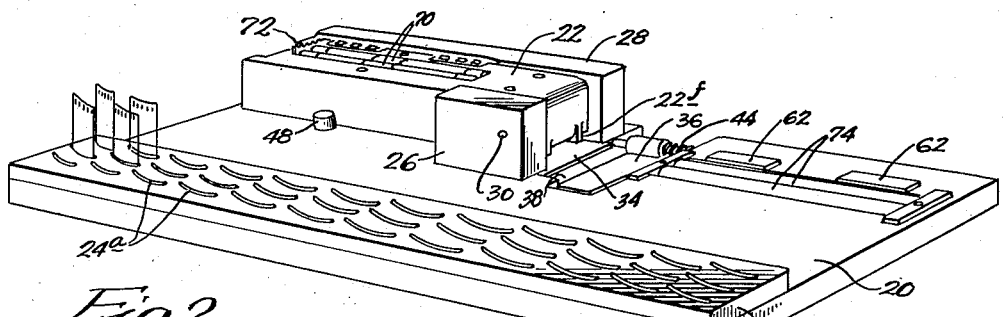
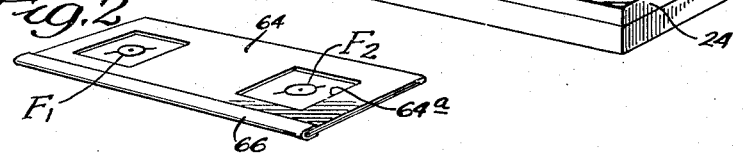
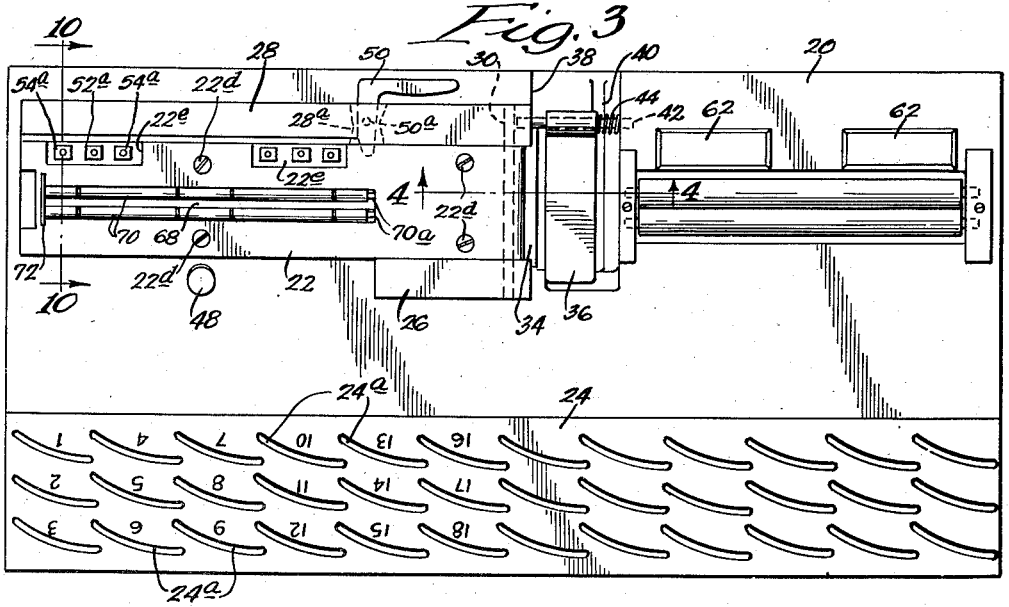
INVENTOR:
Norman L. Rosie,
BY Dawson, Ooms, Booth and Spangenberg,
ATTORNEYS.

July 27, 1954     N. L. ROSIE     2,684,537
STEREOSCOPIC FILM MOUNTING DEVICE
Filed April 22, 1950     3 Sheets-Sheet 2
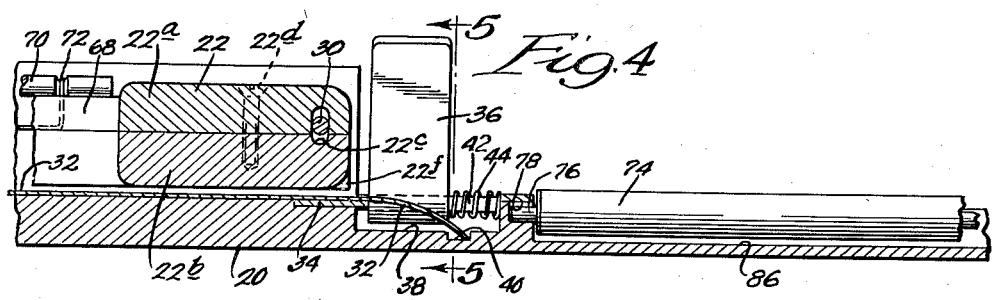
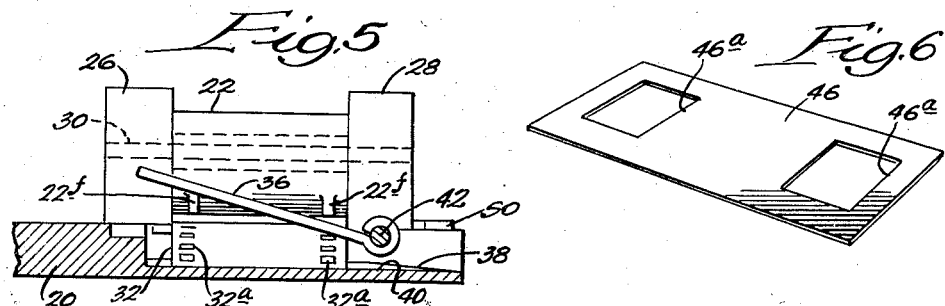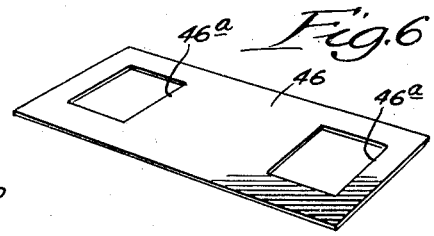
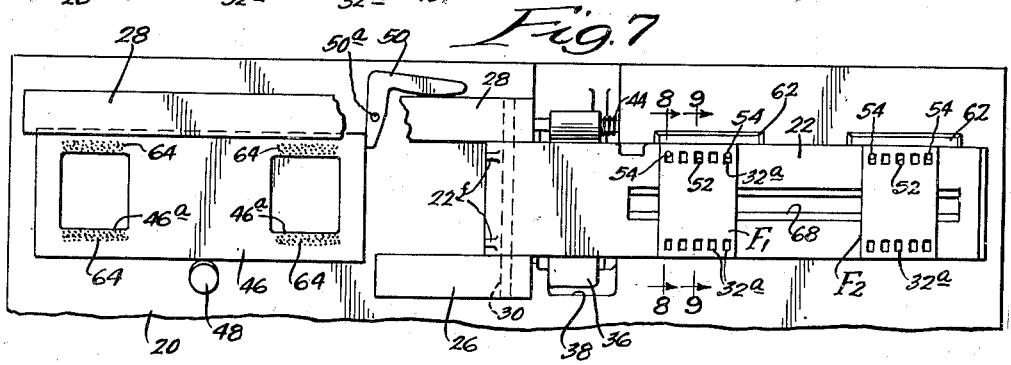
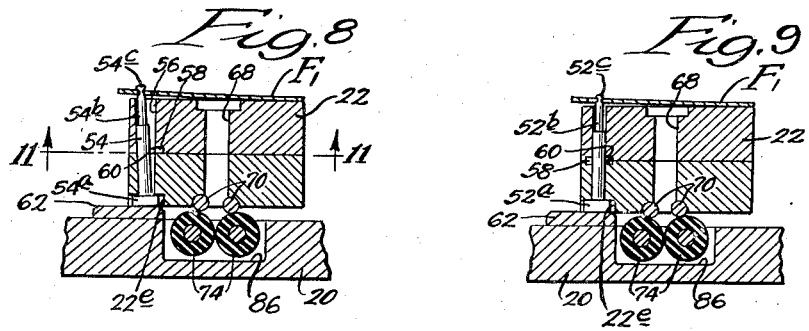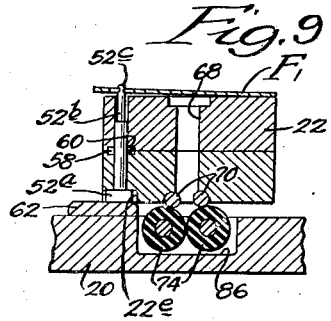
INVENTOR:
Norman L. Rosie,
BY Dawson, Ooms, Booth and Spangenberg,
ATTORNEYS.

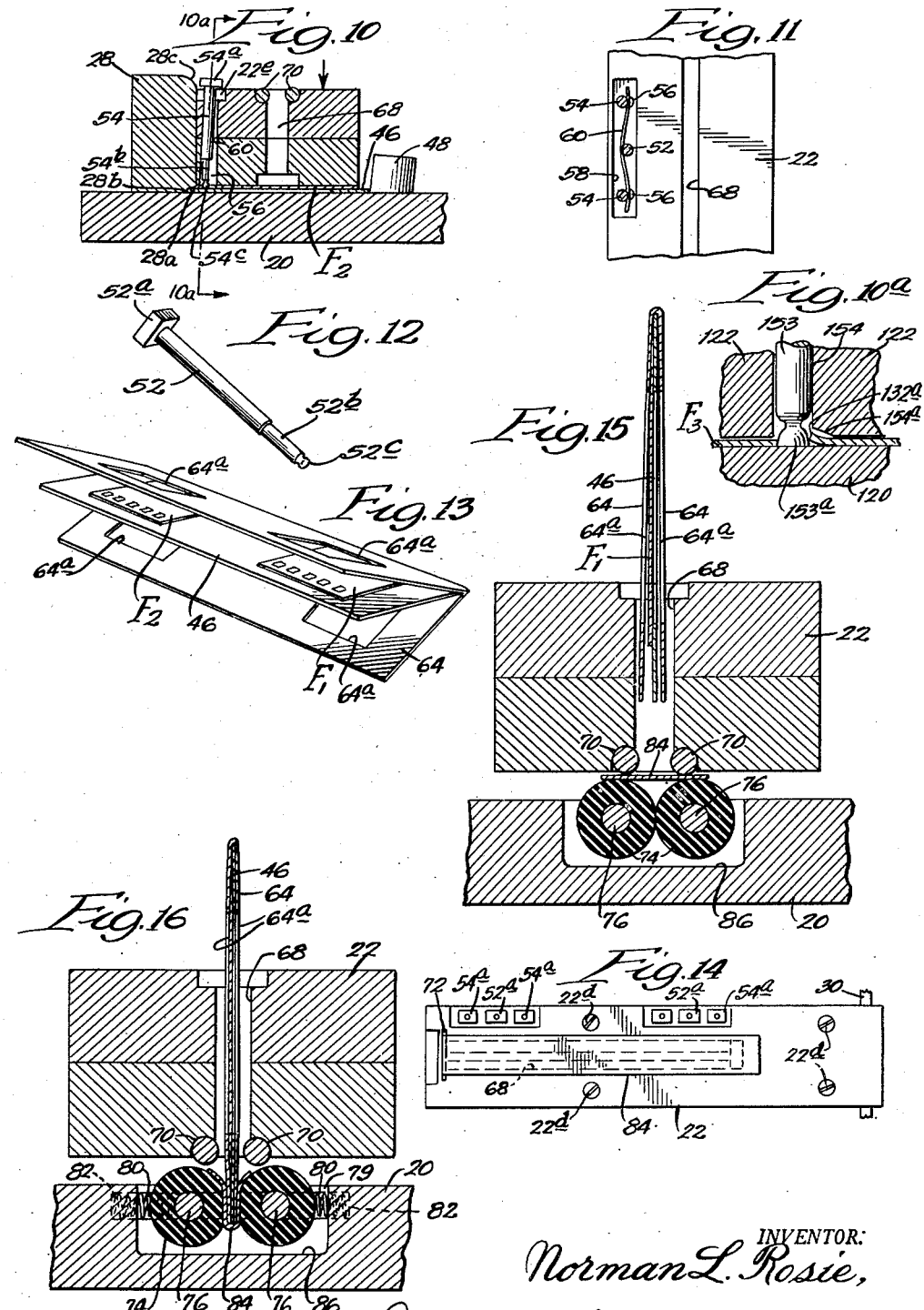

Patented July 27, 1954

2,684,537

UNITED STATES PATENT OFFICE 2,684,537

STEREOSCOPIC FILM MOUNTING DEVICE

Norman L. Rosie, La Grange, Ill.

Application April 22, 1950, Serial No. 157,520

6 Claims. (Cl. 33—184.5)

My invention relates to an improved device to cut and sort stereoscopic film frames, mount the same in indexed relative positions on a carrier and seal the carrier in sandwiched relation between the folded parts of a protective jacket.

Stereoscopic films are taken on 35 mm. or similar motion picture film by miniature cameras capable of simultaneously exposing two frames through lenses spaced by approximately the spacing of the human eyes. In order to obtain the illusion of depth in the resultant picture when viewed, it is essential to mount the frames a fixed predetermined distance from each other which, in most viewing devices, again approximates the spacing of the human eyes. It is also essential that the base lines of each picture of a pair be mounted along an absolutely straight line so that they are coincidental. This is accomplished in the present invention by aligning the base line of each film of a pair parallel to one edge of the film carrier. Deviations from the optimum spacing or twisting of the base line destroys the illusion of depth or causes strain in the eyes of the viewer with consequent annoyance and loss of the true stereoscopic effect. With stereoscopic projectors or viewers equipped with means for adjusting lens separation laterally, any deviation of image pair spacing requires the annoying realigning of lenses for each new picture inserted in the viewing device and in any event cannot compensate for twisting of one film relative to the other.

Moreover, for reasons of film economy the pairs of stereoscopic film frames are frequently interleaved along the length of a continuous film so that the space between each pair of stereoscopic frames is used for one or more other frames. This renders quite difficult the sorting of the frames after cutting, since the frames of the various pairs do not appear adjacent each other. This problem of sorting is rendered more acute by the fact that the stereoscopic effect is obtained only when the respective films are properly oriented relative to each other and individually so that the picture appears right side up and in three dimensions.

In accordance with the present invention an improved device is provided which cuts and sorts the stereoscopic film frames. Upon sorting, the successive picture pairs may be positioned over indexing elements on the device which holds them in predetermined spaced positions for gluing or sealing to the film carrier. The device also provides by means unitary with the films mounting means a mechanism to apply tape to secure the film carrier in a protective jacket.

It is therefore a general object of the present invention to provide an improved device to mount stereoscopic films.

Another object of the present invention is to provide an improved device capable of sorting stereoscopic films.

A further object of the present invention is to provide an improved device to mount stereoscopic films in predetermined spaced relation on a film carrier.

An additional object of the present invention is to provide an improved device to mount stereoscopic film pairs with their base lines coincidental.

Another object of the present invention is to provide an improved device to secure sealing tape to hold a stereoscopic film carrier in a protective jacket.

Another object of the present invention is to provide an improved unitary device to accomplish the aforementioned objects in a systematic manner suitable for easy operation by an amateur photographer and capable of producing highly accurate results by the exertion of comparatively little skill.

The novel features which I believe to be characteristic of my invention are set forth with particularity in the appended claims. My invention itself, however, both as to its organization and method of operation, together with other objects and advantages thereof, may best be understood by reference to the following description taken in connection with the accompanying drawings, in which:

Figure 1 is a view of a device incorporating the present invention as seen in perspective;

Figure 2 is a view of a completely mounted and protected pair of stereoscopic film plates;

Figure 3 is a top plan view of the apparatus in the condition shown in Figure 1;

Figure 4 is a cross-sectional view through the axis 4—4, Figure 3, showing a film strip in cutting position;

Figure 5 is a cross-sectional view through the axis 5—5, Figure 4;

Figure 6 is a view in perspective of a film carrier;

Figure 7 is a fragmentary top plan view showing a pair of stereoscopic film frames in indexed position on the mounting head and about to be swung over the film carrier to be attached to the same;

Figures 8 and 9 are enlarged cross-sectional views through the axes 8—8 and 9—9, Figure 7;

Figure 10 is an enlarged cross-sectional view through the axis 10—10, Figure 3, showing a film frame in position as it is affixed to the carrier;

Figure 10a is an enlarged fragmentary cross-sectional view of a modified embodiment of the present invention as seen through axis 10a—10a, Figure 10;

Figure 11 is a fragmentary cross-sectional view through the axis 11—11, Figure 8;

Figure 12 is a view of an indexing pin in perspective;

Figure 13 is a view of a film carrier with film frames in position and held between the folds of a protective jacket;

Figure 14 is a fragmentary top plan view of the device of Figure 1 showing the sealing tape in position preparatory to sealing a jacket;

Figure 15 is an enlarged cross-sectional view through axis 9—9, Figure 7, but showing the sealing tape in position and the protective jacket about to be inserted; and, Figure 16 is a view like Figure 15 but showing the sealing tape being affixed to the protective jacket.

As seen in Figure 1, the structure of the present invention includes a bed plate 20 carrying the swingable head 22 and the film sorter 24. The head 22 is supported from the bed plate by a pair of spaced blocks 26 and 28, Figures 1 and 2, which define a space to receive the head snugly. These blocks have a pair of aligned openings which receive the pin 30 which forms a swingable support for the head 22. As seen best in Figure 4, the head 22 is composed of a pair of mating blocks 22a and 22b held together by the screws 22d (Figure 3) and together defining the vertically elongated slot 22c which receives pin 30 to secure the head to the bed plate for swinging movements while permitting limited translational up and down motion.

In the first step of mounting an uncut stereoscopic film roll, the film strip with the successive pairs of frames is inserted underneath the head 22 as shown in Figure 4, the film being indicated at 32. The film extends over the stripper plate 34 and under the knife 36 and falls into the recess 38 as shown in Figure 4. The bottom of recess 38 has an indexing groove 40 which forms a stop against which the end of the film abuts to measure off approximately the length of one frame from the end of the film which is, of course, the border of the previously cut frame.

The free end of head 22 is raised slightly so that the teeth 22f (Figure 1) drop into sprocket receiving indexing notches 32a. The free end of head 22 is then raised or lowered to shift film strip 32 back or forward into the exact position relative to stripper plate 34 where the border of the adjacent frames is centered over the stripper plate. The blade 36 is then pressed down to cut the film along the border. Once the proper angle of arc for head 22 is determined for a particular roll of film the arm is held at this angle and the film is drawn or pushed by the number of indexing notches required to bring the next border into cutting position. As film moves under teeth 22f the teeth rise and fall with the ratchet effect as pin 30 moves vertically in slot 22c. The arm 22 is received between posts 26 and 28 with some degree of looseness to permit this operation.

The blade 36 is carried by shaft 42 which is carried by the bed plate 20 adjacent the recess 38. A coil spring 44 seats against the edge of the recess 38 and the blade 36 to hold the blade snugly against stripper plate 34.

As the frames are cut from the end of the film strip as described above, the successive cut frames are placed in the arcuate recesses or slots 24a formed in the sorting plate 24. This is done in the order indicated by the numerals of Figure 3. That is the first film frame is placed in the #1 slot, the second frame is in the #2 slot, the third frame in the #3 slot, and so on.

The camera for which the sorter 24 is intended takes a pair of stereoscopic frames separated by two intervening frames. Two spacing systems are in common use in such cameras (a) the interlaced system in which the film is moved two frames, skipping one frame, after each exposure and (b) the group consecutive system in which the film is moved one frame after each exposure for the first three exposures and then moved four frames, skipping three frames, and repeating this sequence.

Under either of the above camera winding systems, when the films are placed in sorter 24 in order shown by the numerals in Figure 3, the three row slot feature and the orientation of the No. 1 slot 24a in relation to the film receiving pins on arm 22 automatically brings the related film pairs together side by side in sorter 24 and likewise in correct left and right hand position to transfer to corresponding left and right hand sets of pins on arm 22.

When the film frames are placed in the sorter 24 as described above, they may be removed in the pairs to select pairs of corresponding frames in the following sequence:

|  | Interlaced System A | Group Consecutive System B |
| --- | --- | --- |
| 1st picture | Nos. 1 and 4 | Nos. 1 and 4. |
| 2nd picture | Nos. 3 and 6 | Nos. 2 and 5. |
| 3rd picture | Nos. 5 and 8 | Nos. 3 and 6. |
| 4th picture | Nos. 7 and 10 | Nos. 7 and 10. |
| 5th picture | Nos. 9 and 12 | Nos. 8 and 11. |
| 6th picture | Nos. 11 and 14 | Nos. 9 and 12. |
| 7th picture | Nos. 13 and 16 | Nos. 13 and 16. |
| 8th picture | Nos. 15 and 18 | Nos. 14 and 17. |

After using the sorter, the operator quickly learns the sequence to be followed in removing the film frames. For guidance in learning the sequence the corresponding pairs of film receiving slots 24a may be given distinctive colors, a sufficient number of colors being used so that repetitions of the colors cause no confusion.

When the film frames have been cut and placed in the sorter 24, they are ready for mounting on the film carriers. As shown in Figure 6, each carrier comprises a rectangular sheet of cardboard or the like, indicated at 46 with a pair of windows 46a of proper size and spacing to receive a pair of stereoscopic film frames. The pair of film frames is secured to the carrier by appropriate adhesive, such as a plastic cement. While I find the use of cement simple and practical, film carriers precoated with heat sensitive plastic may be used by incorporating heating elements in the base 20.

The bed plate 20 receives the carrier 46 in predetermined position as shown in Figure 7. This position is defined by the undercut edge of the block 28, the upstanding post 48, and the dog 50. Post 48 is attached to base 20 at a slight angle relative to the vertical so that it serves to wedge carrier 46 tightly against undercut edge 28b as shown in Figure 10. As seen best in Figure 3, the dog 50 is received in an opening 28a in the block 28 and is of L-shaped configuration with one leg of the L pinned to the block 28 and bed plate 20 by the pin 50a and extending beyond the confines of the block 28 to form a stop for the carrier 46 as shown in Figure 7. The other leg of the dog 50 extends outside of the block 28 on the side opposite the carrier 46 to form an adjusting handle by which the position of the carrier relative to the bed plate may be adjusted.

The head 22 carries two arrays of film receiving pins in spaced array, one array for each film frame. The center pin 52 of each array (Figures 7 and 9) is fitted snugly in a hole in the head 22 and thus assumes a fixed axial position in relation to the head. The end pins 54 of each array are received in elongated tapered slots 56, Figure 8, formed in the head 22. These slots permit movements of the axes of these pins relative to the head 22 and in a direction at right angles to the lengthy dimension of the head 22. As shown best in Figures 8, 9, and 11, a slot 58 of rectangular cross-section extends between the pins 52 and 54 and defines a chamber in which the leaf spring 60 is located. This spring extends between the pins 52 and 54 as shown in Figure 11 to urge the latter pins towards the edge of the head 22 as shown.

The pins 52 and 54 have rectangular heads 52a and 54a, respectively, as shown in Figures 3, 8, and 9. These are received in the rectangular slots 22e formed in the surface of the head 22. At their opposite ends, the pins 52 and 54 have reduced portions 52b and 54b, respectively, which terminate in somewhat ball shaped heads 52c and 54c, respectively.

When the head 22 is swung to the face up position of Figures 7, 8, and 9, the heads 52a and 54a of the pins 52 and 54 engage the pads 62 mounted on the bed plate 20. These pads force the heads 52a and 54a to a flush position relative to the bottom face of the head 22 and thus cause the heads 52c and 54c to protrude above the head 22 since the pins are longer than the thickness of head 22.

A pair of cut stereoscopic film frames $F_1$ and $F_2$, Figure 7, are placed over the head 22 with their indexing sprocket holes 32a received on pins 52 and 54 as shown. Since the pins 52 are received by the center indexing hole (or other predetermined indexing hole), the frames are positioned in predetermined spaced positions relative to each other, the pins 54 ride in the end sprocket holes (or other predetermined indexing holes) and urge each film frame in direction to cause the pins 52 to engage the inner side of the sprocket hole in which it is held. This locates each frame at a predetermined position transversely of the head 22 and, since spring 60 is floating, it exerts like force on each pin 54 and the frames are oriented in predetermined positions relative to the head 22 and parallel to each other.

The film frames are affixed to the carrier 46 by swinging the head 22 from the face up position to its position in Figure 10. Prior to this step the carrier 46 is partially coated with cement adjacent the margins of the window 46a so that the film frames $F_1$ and $F_2$, when pressed against the carrier 46, are securely affixed thereto.

When the head 22 is swung from the position of Figure 7 to that of Figure 10, the film frames $F_1$ and $F_2$ are held against falling by the pressure engagement with the pins 52 and 54 and by the heads 52c and 54c on these pins. The elongated tapered slots 56, Figure 8, are positioned so that the edge of the film frame projects slightly beyond the edge of arm 22 and as that arm is swung downwardly the upper edge 28c of block 28, Figure 10, guides the film edges along the plane surface of block 28. The constant pressure of pins 54 against sprocket holes keeps the film edges pressed against the straight side of block 28 and therefore parallel to the edge of the carrier 46 which fits in slot 28a. These positions are sustained for sealing contact with carrier 46. The undercut slot 28a, Figure 10, is only wide enough to accommodate the thickness of carrier 46 and does not allow the film edges to enter, while providing a lower edge 28b to maintain the alignment of carrier 46.

When the head 22 is pressed down on carrier 46, the heads 52c and 54c of the pins 52 and 54 engage the sides of the carrier 46 and the pins are accordingly pushed up as shown in Figure 10. This partially releases the pins from the film frames so that when the cement 64 has dried, the film frames can be easily removed.

Figure 10a is an enlarged fragmentary view showing an alternative form of the pins 52 and 54 capable of holding the film frames snugly without cutting the film. The modified pin construction, indicated at 153, has a somewhat bell shaped head 153a which is inwardly tapered from its end and at its end is of slightly greater size than the indexing openings 132a formed in the film F. The head 122 has a slot 154 which snugly receives the pin 153. This slot is beveled at 154a.

When the film is forced downward to the head of pin 153a, the marginal portions thereof adjacent the beveled side of opening 132a flex as shown in Figure 10a, thereby pulling the film so that the opposite side of indexing opening 132a fits tightly against head 153a during sealing contact, thus insuring exactly similar registration of successive films in relation to the center pins 153.

After the film frames are mounted on the carrier 46, the carrier is sandwiched between the folded sides of the protective jacket 64. As shown in Figure 13 this jacket consists of a folded cardboard sheet adapted to fit over the carrier 46 and having windows 64a in registry with the films $F_1$ and $F_2$. The jacketed unit is held together with a strip of sealing tape 66, Figure 2, located along the open edge of the jacket.

The head 22 has a slot 68, Figures 7, 14, 15, and 16, which is of sufficient length and width to receive the jacket 64 and the carrier 46, together with the film frames cemented in place as shown in Figure 15. A pair of small diameter rollers 70 are positioned on opposite sides of the head 22 opposite the top face as is shown in Figures 3 and 15. These rollers are mounted on shafts 70a, Figure 3, which are received in the head 22. The rollers are received in conforming grooves in the head 22 as seen in Figure 15, the rollers 70 protruding from the head 22 in the region adjacent the mouth of the opening 68 so that a piece of sealing tape may be placed on the rolls without adhering to the body of head 22.

At one end of the rolls 70 a toothed cutting edge 72, Figures 1 and 14, is mounted. This edge is defined by a metal plate which is mounted in a suitable slot in the head 22.

When the head 22 is in the face up position shown in Figure 15, the slot 68 registers with a pair of rollers 74. These rollers are mounted on shafts 76, Figures 4 and 15, the shafts being held in rectangular elongated slots 79, Figures 4 and 16. The rollers are biased to engaged positions by springs 80 which are received in the sockets formed by the slots 79 and engage the free ends of the shafts 76. A spring 80 is located at each end of each shaft 76.

When it is desired to mount a film frame receiving carrier 46 in a protective jacket 64, Figure 13, the head 22 is first swung to the face down position of Figure 3 and a strip of sealing tape 84 placed over the slot 68 as shown in Figure 14, the end of the strip being torn off along the edge 72. Pressure sensitive tape is particularly suitable for this purpose and is laid with its adhesive edge facing the head 22 so that it tends to stick to rollers 70. However, since only the rollers are in contact with the tape, the tendency to stick is minimized.

After the tape 84 is laid over slot 68, the head 22 is swung to the face up position of Figures 7, 15, and 16. The jacket 64 is then inserted in the slot 68 with the film carrier 46 and in position facing down as shown in Figure 15. Upon further insertion of the jacket 64, the open edge engages the adhesive face of the tape 84 and the tape wraps about the edge of the jacket 64 as it is forced down between rollers 74. When the jacket 64 is fully inserted, the tape 84 is completely pressed about its edge and the completed unit may be withdrawn without causing the tape to come off.

The rollers 74 are made of sponge rubber to accommodate variations of thickness along the length of the jacket 64. If desired, however, a plurality of rollers 74 may be placed on each side of the slot 86, Figure 16, in which the rollers 74 are located and individual springs used with each roller. The rollers can then move independently to achieve a maximum degree of accommodation for variations in the thickness of the jacket 64.

While for purposes of illustration the window type of jacket shown in Figure 13 has been described, other types of protective jackets may be used such as two glass slides in which case the top and bottom sides are sealed as described and the shorter sides are sealed by cutting appropriate lengths of tape as indicated by guide marks which may be engraved on head 22 at proper distance from toothed cutting edge 72.

To further facilitate the binding of the short side of the glass slide sandwich, the small diameter rollers 70 may consist of a plurality of independently rotatable rollers in parallel array on shafts 72a, Figure 3, so that two separate lengths of tape may be attached to the rollers 70 and independently transferred to different ends of the glass slide sandwich when pressed against a plurality of rollers 74. In this connection additional toothed cutting edges similar to 72, Figures 3 and 14, may be attached to the other end of slot 68 or adjustably positioned along the tape receiving surfaces of rollers 70 to tear off short lengths of tape measured to be temporarily affixed to rollers 70.

While the apparatus, as illustrated, is best suited for the free hand holding of a tape roll while applying tape to rollers 70, a fixed or demountable tape spool holder arm or a cupped trough may be attached to base 20 along with a fixed anvil to which the loose end of the tape may be temporarily affixed.

The arrangement of the various elements on base 20 may be altered from that shown in the accompanying drawings without detracting from the novel features thereof. For instance, the sorting element 24 may be made removable and provided in multiple sets so that more than one roll may be cut and sorted before proceeding with the mounting and binding operations. An alternative arrangement is envisioned where the head pivot pin 30 is secured at a right angle, in the plane of the base, to that shown in Figure 1. In this case the space blocks 26 and 28 (but not the undercut portion of 28) may be located at the ends of head 22 and the slots 22c run in the lengthy direction of head 22. The arm 22 then describes a semi-circular arc looking as seen from the short side of head instead of the arcuate motion of the structure of the drawings. To lengthen the radius of the arcuate motion and make this embodiment more easily handled, side arms may be attached to the short ends of head 22 and pivot pin 30 made in two portions passed through aligned openings in the side arms. In this alternative arrangement the arrays of film receiving pins 52 and 54 may be positioned either in the long edge of head 22 located farthest from pivot pin 30 or they may be located on the long edge nearest to pivot pin 30. In either arrangement the undercut straight-edge side of block 28 is located on base 20 so that it faces the side of head 22 on which the film receiving pins are located when the head is pressed down on film carrier 46. If the undercut block is located on the side nearest pivot pin 30 it must be lowered or beveled sufficiently to clear the edge of head 22 as it is rotated. In this alternative arrangement the slot 86 and biased rollers 74, Figures 4 and 16, would be located on base 20 parallel to pivot rod 30 and registered under slot 68 in head 22 when the head is rotated to the face up position.

In addition, while the parallelism of the rear film support touching the edge of slot 28b, Figure 10, with the front film touching edge is a feature of this invention, the back edge does not have to be an integral part of block 28 as illustrated but may be defined by two or more downwardly projecting pins or bars which may be retractable into the body of block 28. Such retractable pins may be arrayed in sets parallel to the front edge of slot 28b but each set being at a different distance from the front edge of the slot, thereby permitting adjustment of the unit to accommodate film supports having various windows to support edge dimensions.

It will be apparent from the above description that the present invention provides a unitary structure capable of cutting, sorting, mounting and jacketing stereoscopic film frames in an accurate and systematic manner without requiring skilled operation. It will, of course, be apparent that many variations and alternative constructions may be made without departing from the true spirit and scope of the invention. I intend by the appended claims to cover all such variations and alternative embodiments that come within the true spirit and scope thereof.

What I claim as new and desire to secure by Letters Patent of the United States is:

1. In a device to secure stereoscopic film frames having sprocket holes to a film carrier in predetermined spaced relationship, the improvement comprising a head mounted for movement and arranged to be pressed against said carrier, pins in spaced arrays on the head, the pins of each array being adapted to receive the sprocket holes of one film, at least one pin of each array being mounted on the head with a fixed axis relative thereto to receive one sprocket hole of each film and at least one other pin in each array being biased in a direction transverse to its axis to hold the film snugly against the pin having a fixed axis, all of the pins being shiftable along their respective axes when the head is pressed against the carrier to positions within said head to release the film frames.

2. In a device to mount stereoscopic film frames in predetermined spaced relation on a film carrier, the improvement comprising a bed plate adapted to receive a film carrier at a predetermined position thereon, a head movably affixed to the bed plate and swingable thereover to a face down position against the film carrier or a face up position to receive films, the head having a plurality of arrays of indexing pins, one array for each film, at least one pin in each array having a fixed axis relative to the head and other pins having movable axes relative to the one pin and being biased in direction transverse to their axes to hold each film snugly against the pin having a fixed axis, the pins being axially shiftable to positions within said head to release the film frames when the head is against a carrier.

3. In a device to mount stereoscopic film frames in predetermined spaced relation on a film carrier, said device comprising a head adapted to be pressed against an adhesive covered carrier to affix the films thereto, the head having arrays of indexing pins to hold the films in predetermined positions thereon, the pins being longer than the thickness of the head and being axially shiftable therein to protrude when the head is placed on a flat surface, one pin of each array having a fixed axis and other pins having movable axes and being biased to hold the film snugly against the one pin.

4. In a device to mount stereoscopic film frames on a glue-equipped carrier, each of said film frames having at least three indexing openings in predetermined spaced relation, said device comprising a head adapted to be pressed against said glue-equipped carrier to affix the films thereto, the head having arrays of three indexing pins, one array for each film, one pin of each array having a fixed axis and the other pins having movable axes and being biased in direction to engage the film snugly against the one pin, the pins being axially shiftable and of greater length than the thickness of the head to protrude from the surface thereof when the head is pressed against a flat surface.

5. In a device to mount stereoscopic film frames in predetermined spaced relation on a film carrier, the improvement comprising a bed plate adapted to receive a film carrier at a predetermined position thereon in relation to a straight edge defined by the bed plate, a head movably affixed to the bed plate and swingable thereover to a face down position against the film carrier or a face up position to receive films, the head having a plurality of arrays of indexing pins, one array for each film, at least one pin in each array having a fixed axis relative to the head and other pins having movable axes to hold each film snugly against the fixed pin or against the straight edge when the head is in the face down position, the pins being axially shiftable to positions within said head to release the film frames when the head is against the carrier.

6. In a device to mount a film frame at a predetermined point and orientation on a carrier, the improvement comprising a head mounted for movement and arranged to be pressed on the film carrier, spaced pins on the head adapted each to engage a predetermined point on the film frame to hold the same at a predetermined position on the head, said pins being yieldable axially relative to the head to positions within said head to disengage the film frame when pressed on the film carrier, and an indexing member defining a lower edge to engage and orient the film carrier and an upper edge to engage and orient the film.

References Cited in the file of this patent

UNITED STATES PATENTS

| Number | Name | Date |
| --- | --- | --- |
| 1,634,699 | Upjohn | July 5, 1927 |
| 1,839,366 | Claybourn | Jan. 5, 1932 |
| 2,236,197 | Moore | Mar. 25, 1941 |
| 2,417,496 | Huebner | Mar. 18, 1947 |
| 2,431,535 | Bergstrom | Nov. 25, 1947 |
| 2,481,928 | Huebner | Sept. 13, 1949 |
| 2,488,355 | Wagner | Nov. 15, 1949 |
| 2,496,406 | Patrick | Feb. 7, 1950 |

FOREIGN PATENTS

| Number | Country | Date |
| --- | --- | --- |
| 825,068 | France | Feb. 23, 1938 |
| 899,729 | France | June 8, 1945 |